(12) United States Patent
Fraczek et al.

(10) Patent No.: US 6,685,592 B2
(45) Date of Patent: Feb. 3, 2004

(54) ROLLER SHADE CLUTCH WITH INTERNAL GEARING

(75) Inventors: Richard Fraczek, Stamford, CT (US); Martin M. Balta, Bridgeport, CT (US); David M. Cross, South Westport, CT (US)

(73) Assignee: Rollease, Inc., Stamford, CT (US)

( * ) Notice: Subject to any disclaimer, the term of this patent is extended or adjusted under 35 U.S.C. 154(b) by 0 days.

(21) Appl. No.: 10/393,797

(22) Filed: Mar. 20, 2003

(65) Prior Publication Data

US 2003/0178276 A1 Sep. 25, 2003

Related U.S. Application Data

(60) Provisional application No. 60/366,467, filed on Mar. 20, 2002.

(51) Int. Cl.[7] .......... F16H 35/02; F16H 37/12; F06B 9/26; F16D 13/04; F16D 23/00
(52) U.S. Cl. .......... 475/14; 160/166.1; 192/32
(58) Field of Search .......... 475/14; 192/32, 192/43; 160/166.1

(56) References Cited

U.S. PATENT DOCUMENTS

| | | | | |
|---|---|---|---|---|
| 3,135,369 A | * | 6/1964 | Nisenson et al. | 192/223.4 |
| 4,126,366 A | | 11/1978 | Handler et al. | |
| 4,224,973 A | * | 9/1980 | Hugin | 160/178.1 V |
| 4,372,432 A | | 2/1983 | Waine et al. | |
| 4,433,765 A | | 2/1984 | Rude et al. | |
| 4,657,060 A | * | 4/1987 | Kaucic | 160/168.1 V |
| 5,586,631 A | * | 12/1996 | Benthin | 192/223.2 |
| 5,641,046 A | * | 6/1997 | Levenberg | 192/54.5 |
| 5,803,148 A | * | 9/1998 | Madsen | 160/176.1 R |
| 6,123,140 A | * | 9/2000 | Bergamaschi | 160/316 |
| 6,148,893 A | * | 11/2000 | Cadorette | 160/176.1 P |
| 6,158,563 A | * | 12/2000 | Welfonder et al. | 192/223.2 |
| 6,305,456 B1 | * | 10/2001 | Sanchez | 160/188 |
| 6,379,276 B1 | * | 4/2002 | Cheng | 475/4 |

* cited by examiner

*Primary Examiner*—Tisha D Lewis
(74) *Attorney, Agent, or Firm*—Gottlieb, Rackman & Reisman, P.C.

(57) ABSTRACT

A bi-directional clutch for operating a window dressing such as a roller shade includes a protective guard for securing the window dressing to a stationary structure, a gear box for transmitting rotation to an output member in response to the operation of an elongated operating member such as a cord, and an antirotational member that prevents the undesirable operation of the output member. The output member is coupled to the window dressing. The gear box includes a gear pulley coupled to the elongated operating member, a planetary gear and a stationary gear. The gear box is arranged and constructed to transmit motion to the output member in response to the activation of the elongated operating member, at a predetermined mechanical advantage.

18 Claims, 3 Drawing Sheets

ROLLER SHADE CLUTCH WITH INTERNAL GEARING

RELATED APPLICATION

This application claims priority to Provisional Application Ser. No. 60/366,467 filed Mar. 20, 2002 and incorporated herein by reference.

BACKGROUND OF THE INVENTION

A. Field of Invention

This invention relates to a bi-directional clutch, and, more particularly, to a clutch having internal gears to provide a mechanical advantage. The clutch is particularly useful for operating a window dressing such as a roller shade.

B. Description of the Prior Art

Roller shades are often used as window dressing and provide both a practical and an esthetic function. Typically, a roller shade includes a tubular mandrel and a decorative panel wound on the mandrel. The mandrel can be selectively rotated by a user either in one direction or the other causing the panel to be either raised or lowered, depending on how it is wound on the mandrel. The roller shade is provided at its two ends with mounting means so that it can be mounted on a window frame or other similar location, using suitable brackets. Normally, one end of the roller shade is a simple rotatable coupling that allows the roller shade to rotate with respect to the bracket. The other end is provided with a bi-directional clutch that provides a mechanical advantage during the operation of the roller shade. Bi-directional clutch mechanisms of this type are disclosed in U.S. Pat. Nos. 4,433,765 and 4,372,432, incorporated herein by reference. These reference disclose clutch mechanisms in which the mechanical advantage is developed between a large pulley and a small shaft. One or more springs are also provided as a means for locking the mandrel to prevent undesirable rotation. Other clutch mechanisms are also known which are based on frictional braking. U.S. Pat. Nos. 3,135,369 and 3,920,106 also disclose bi-directional clutches useable for roller shades.

Recently there has been an increased need for roller shades having larger sizes and/or weights which in turn require stronger clutch mechanisms with a larger mechanical advantage, normally requiring more space. However, in the existing roller blinds, since mechanical advantage is dependent on the relative diameters of a pulley and a small shaft, and since the shaft has already been minimized, the mechanical advantage can be increased by increasing the size of the pulley. However, this is not a practical solution because space is too limited to accommodate a larger pulley, and in addition, a larger pulley may not be esthetically unacceptable.

In addition, a stronger clutch mechanism requires more springs for locking the roller blind to prevent its undesirable rotation. However, more springs complicate the structure of the clutch mechanism, and increase the force required to operate the same.

OBJECTIVES AND SUMMARY OF THE INVENTION

Accordingly, it is a broad objective of the present invention to provide an improved bi-directional clutch particularly suited for roller shades and other window dressings.

It is a further objective to reduce the number of springs required and thereby reduce the inherent friction associated with the operation of the bidirectional multi-spring clutch.

It is still a further objective to locate the gear box between the user interface (for example, a cord or a bead chain) and the wrap springs of the clutch to permit the use of less force in releasing the wrap spring of the clutch to yield a user interface with a smother performance.

Yet another objective is to provide a clutch mechanism that can provide a larger mechanical advantage then previous clutch mechanisms but without a corresponding increase in size.

These and other objectives of the present invention are obtained by providing a clutch, particularly useful for operating a window dressing, that includes an input member arranged to be activated by a user for operating the window dressing; an output member coupled to the window dressing, antirotational means adapted to prevent the output member from rotation in response to a rotational torque from the window dressing, and a gear box coupled to the input member and adapted to transmit a rotational motion at a mechanical advantage to the output member in response to the activation of said input member. The input member may include an elongated element such as a cord, a string, a chain, etc., arranged for pulling by the user. The gear box includes a gear pulley coupled to the elongated member and arranged to rotate in response to the pulling of the elongated element.

The gear box includes a stationary gear, a stationary drum attached to the stationary gear, a rotating member mounted coaxially on the drum and a planetary gear arranged between the gear pulley and the stationary gear to transfer rotation to the rotating member.

The antirotational means is associated with the stationary drum and the rotating member and it includes spring coils adapted to selectively form an interference fit with the stationary drum, thereby preventing undesirable rotation of the rotation member.

In another aspect of the invention, the clutch is provided for operating a window dressing mounted on a stationary structure, and includes an end member adapted for mounting the window dressing to the stationary structure. The end member receives a cord adapted for manipulation by a user to operate the window dressing. The end member includes a gear box adapted to translate a movement of the cord into a rotation at a preselected mechanical advantage. An output member is adapted to couple the rotation to the window dressing. In addition, an antirotational member is coupled to the output member to prevent undesirable rotation.

In another aspect of the invention, a bi-directional clutch is provided for supporting a window dressing on a structure. The clutch includes a protective guard adapted to be secured to the structure. The protective guard is provided with a disk with a lip and a drum disposed coaxially on the disk. A drive is also provided that has a boss and hub. The hub is facing the lip to define a chamber, and the boss is disposed telescopically over said drum. A tubular housing is provided that is disposed telescopically over the boss and is adapted to engage the window dressing. A gear box is disposed in the chamber, and is coupled to an elongated operating member. The gear box is adapted to transfer a rotation to the tubular housing when the elongated operating member is manipulated by the user. Preferably, the clutch includes an antirotational member disposed between the drive and the tubular housing and is adapted to prevent undesirable rotation of the tubular housing. The antirotational member includes a coil spring wound between the drum and the boss.

The gear box includes a gear pulley arranged to receive the elongated member, including internal teeth. A stationary gear is attached to the protective guard and one (preferably several) planetary gear rotationally mounted between the internal teeth and the stationary gear. The planetary gear is mounted on the hub.

Further objectives, features and advantages of the invention will become apparent upon consideration of the following detailed description of preferred, but nonetheless illustrative embodiments, when considered in conjunction with the following drawings, in which:

DETAILED DESCRIPTION OF THE DRAWINGS

Figure 1:
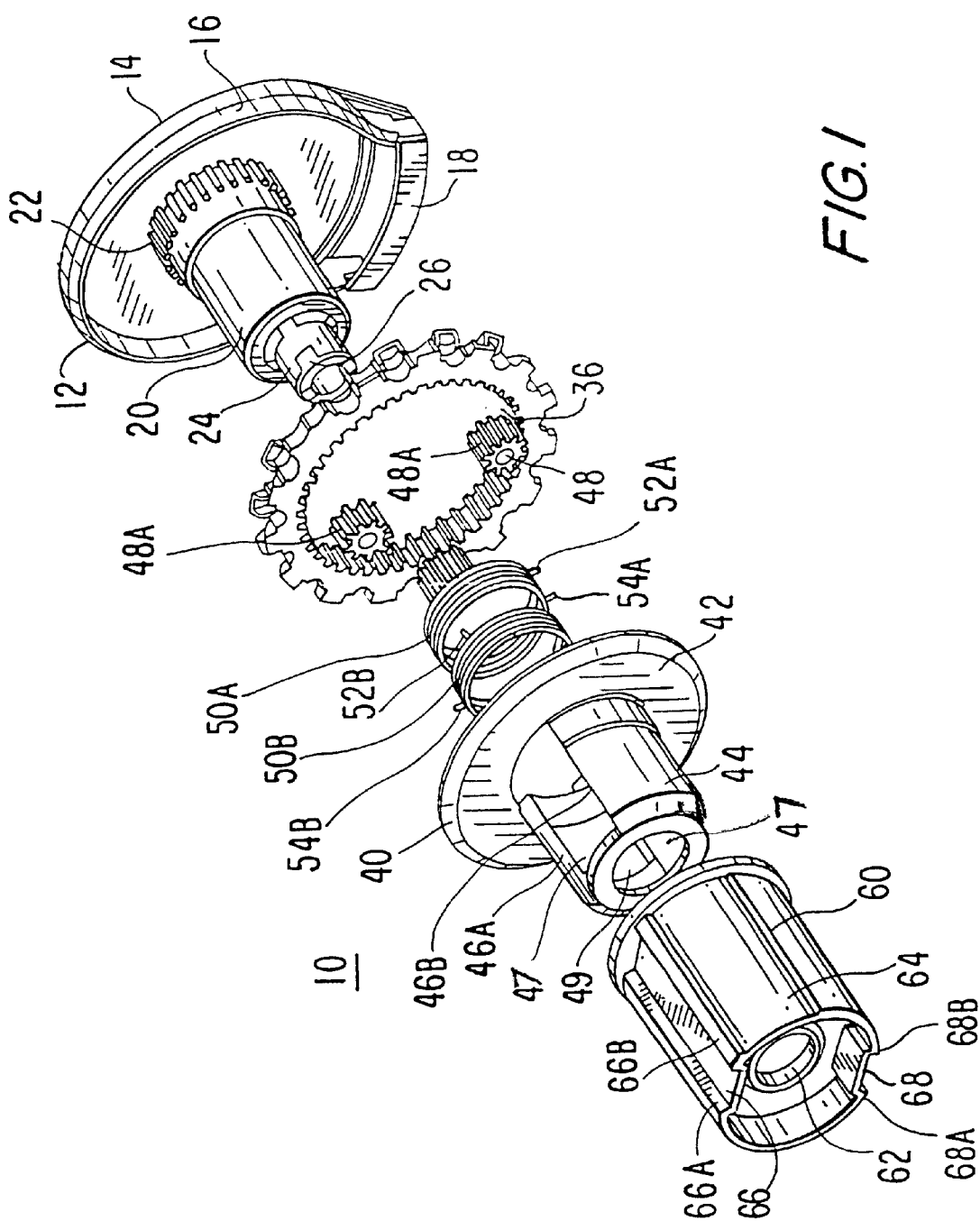
FIG. 1 shows an exploded orthogonal view of a bi-directional clutch mechanism constructed in accordance with this invention and that can incorporated into a roller blind.
Figure 2:
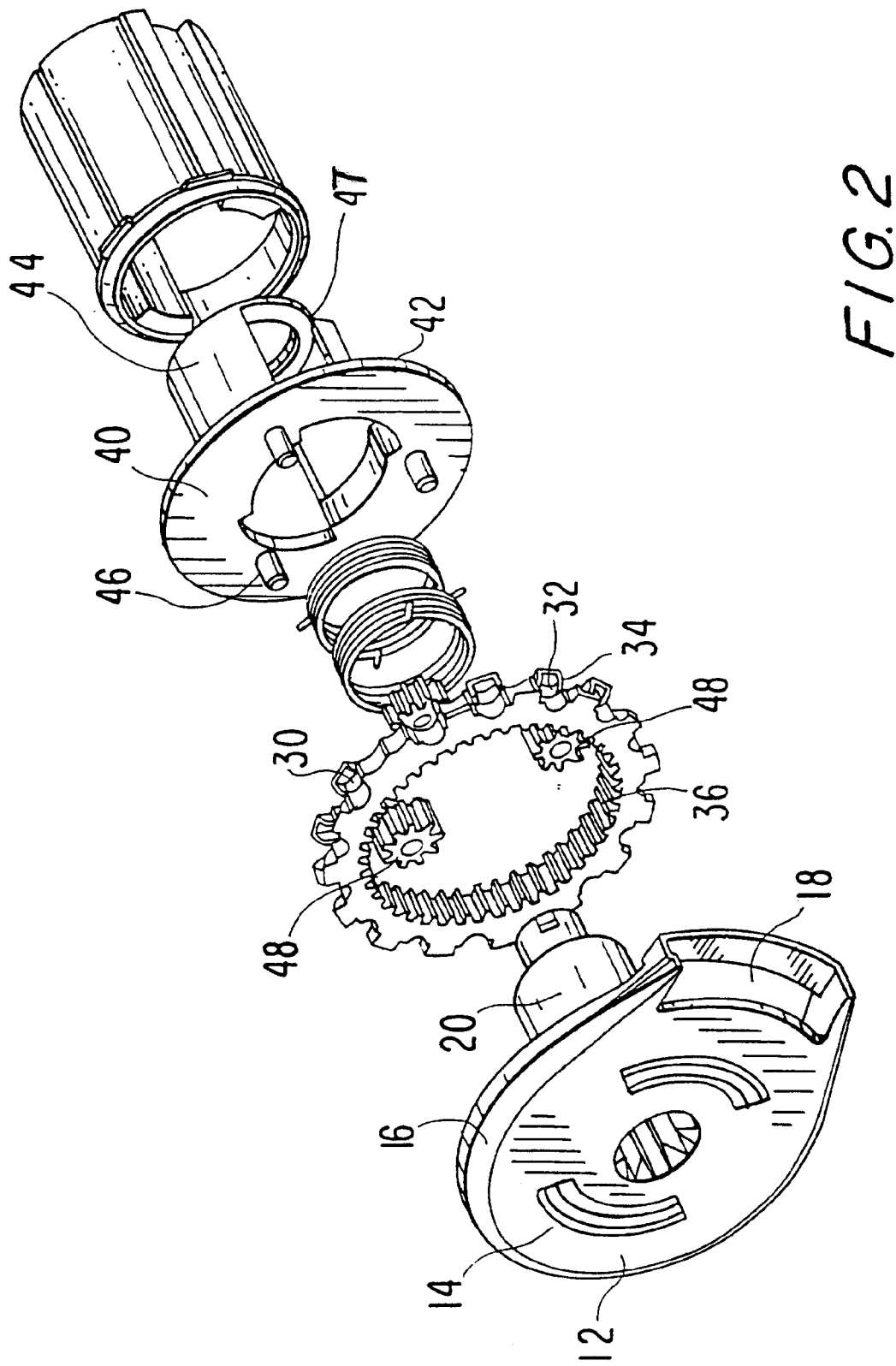
FIG. 2 shows an exploded orthogonal view of the mechanism of FIG. 1 taken from a different angle.

Referring now to the drawings, and more particularly to FIGS. 1 and 2, a clutch 10 constructed in accordance with this invention includes an end member consisting of a protective guard 12 including an outer disk 14. The outer disk 14 is adapted to couple to a bracket (not shown) used to mount a respective window dressing to a structure (such as a window frame) in a conventional manner. A lip 16 is disposed circumferentially around the disk 14 and is cut at one location to form a mouth 18. Attached to an inner surface of the guard 12 is a cylindrical drum 20. Disposed at the distal axial end of this drum 20, adjacent to the inner wall of guard 12, there is provided a toothed gear 22. The opposite or free end of the drum 20 is provided with two semicircular extensions 24 separated by a slot 26. All the remaining elements of the clutch 10 are mounted telescopically on drum 20 as described in more detail below.

Next, the clutch has a gear pulley 30. Gear pulley 30 has the shape of a ring with the outer surface being formed with a plurality of teeth 32 separated by depressions 34. The teeth 32 and depressions 34 are constructed and arranged to entrain a beaded cord described below in conjunction with FIG. 3. The inner surface of the gear pulley 30 has a plurality of gear teeth 36.

Next, the clutch 10 has a spring drive 40 formed of a ring-shaped hub 42 and a tubular boss 44. The ring-shaped hub 42 has on its surface facing guard 12 two or more axles 46 (in FIG. 2 three such axles are shown). Each of the axle supports a planetary gear 48. The intermediate gears are rotatably supported on the axles 46. Each planetary gear 48 has outer teeth 48A.

The boss 44 has an inner diameter that is larger than the diameter of drum 20 so that when the boss 44 is slipped over the drum 20, there is an annular space therebetween. The clutch 10 has two identical coil springs 50A, 50B that are mounted between the drum 20 and the boss 44. Each of the springs 50A, 50B has an inner tang 52A, 52B and an outer tang 54A, 54B. These tangs extend radially outwardly as shown. The coil springs are wound precisely with a diameter that is preferably slightly smaller than the diameter of drum 20. Moreover, the coil springs are preferably made of a high quality steel and preferably have a rectangular cross section.

As a result, the coils of the springs present an almost continuous inner cylindrical surface that rests on, and forms an interference fit with, the outer surface of drum 20. The coil springs 50A, 50B are mounted on the drum by squeezing their respective inner and outer tangs together thereby causing the coils of the springs to expand and slip over the drum 20. When the tangs are released, the springs settle snugly over the drum 20.

Boss 44 is formed with slots 46, 48. Slot 46 is defined between two axial edges 46A, 46B. The angular dimension of these slots is slightly larger than the angular separation between the tangs of one of the coils 50, 52. The front end of the boss 44 as seen in FIG. 1 is terminated with a circular hole 49. When the spring drive 40 is inserted over the drum 20, its hub 42 defines an annular chamber with the outer disk 14. This annular chamber houses and protects the gear pulley 30 and planetary gears 48.

Finally, a tubular housing 60 fits over the boss 44. The tubular housing has a front end with a small axial hole 62. This hole 62 is sized and shaped to receive the extensions 24 on drum 20.

The housing 60 has in its cylindrical surface 64 two axial troughs or keys 66 and 68. The trough 66 is formed with two interior axial walls 66A, 66B and trough 68 is formed with two axial walls 68A, 68B. The angular distance between these walls is smaller than the angular spacing between the tangs of the coils.

Typically, window dressings consist of a tubular member supporting a decorative panel. The housing 60 is arranged and constructed so that it can be mated with the tubular member (not shown) of a decorative panel. In this manner the decorative panel is supported at least at one end by the clutch 10.

The clutch is assembled as follows. First, a cord 90 is trained around the gear pulley 30. Preferably the cord 90 is formed with spherical beads 92 or other protrusions that fit between the teeth 32. Alternatively, cord 90 may have a uniform cross section, in which case an alternative pulley design can be implemented. Gear pulley 30 is positioned adjacent to disk 14 with the cord 90 extending through the mouth 18.

Next, the coil spring 50A, 50B are installed on the drum 20, the planetary gears 48 are installed on axles 46 and the spring drive is telescopically positioned over the drum 20, with the planetary gears 48 engaging the teeth 36 on the gear pulley and gear 22. The spring drive 40 is positioned over the drum 20 and coil springs 50A, 50B so that the tangs of each coil are disposed in one of the slots 46, 48. For example, the tangs 52A, 54A of coil spring 50A can be positioned in slot 48 while the tangs 52B, 54B of coil spring 50B can be positioned in slot 46. The tangs maintain their angular separation as they are seated in these slots.

Figure 3:
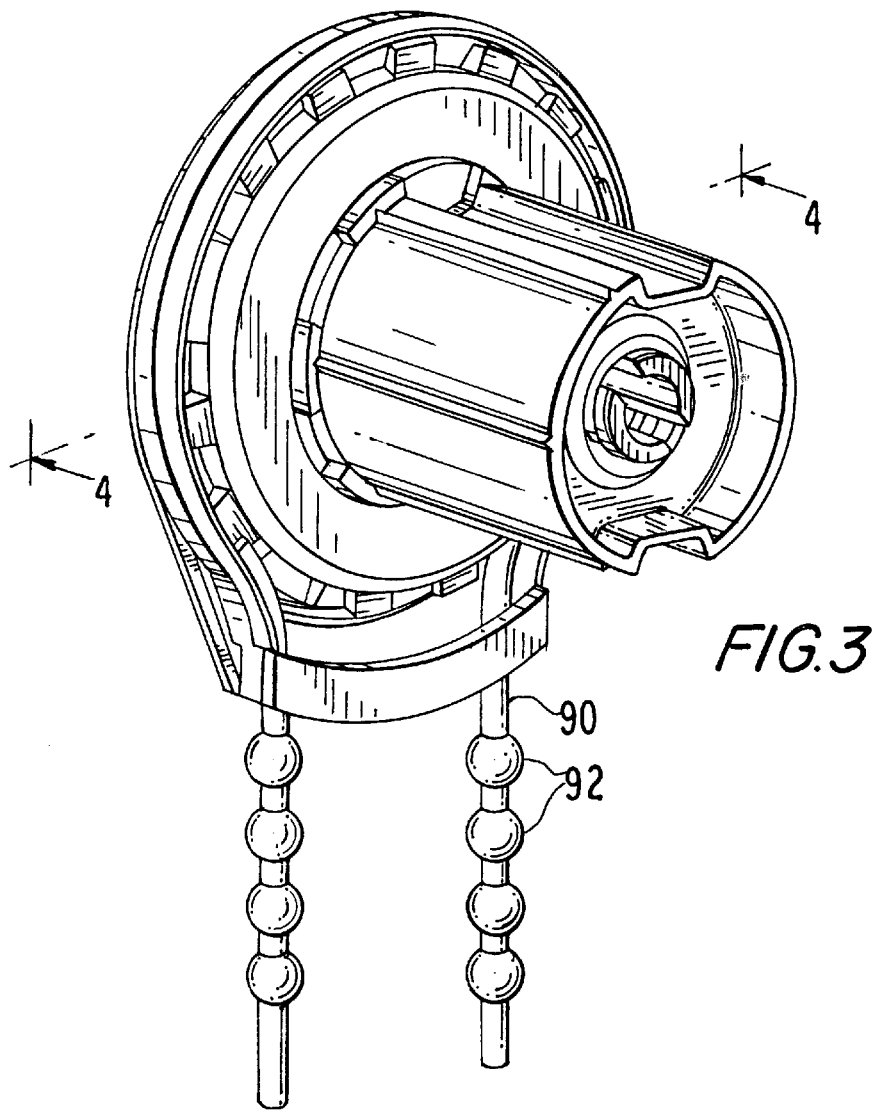
FIG. 3 shows an orthogonal view of an assembled bi-directional clutch mechanism in accordance with this invention.
Figure 4:
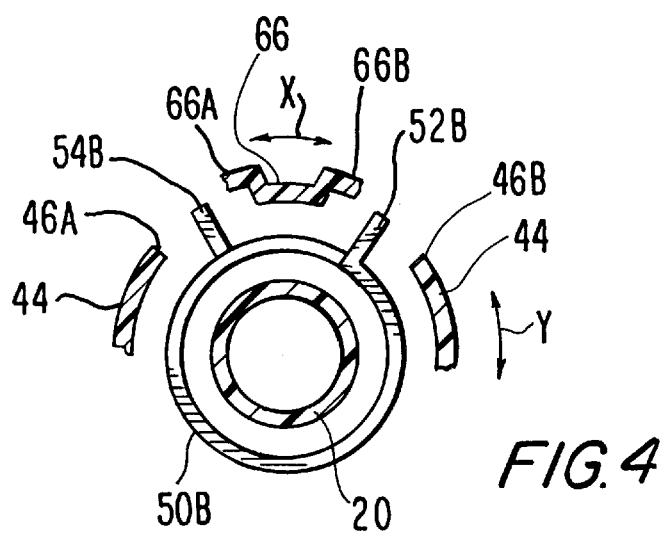
FIG. 4 shows a cross-sectional view taken along lines 4—4 in FIG. 3.

Next, the housing 60 is moved telescopically over the boss 44, with axial troughs 66, 68 being positioned over slots 47. The troughs 66, 68 are dimensioned angularly so that each trough fits radially and angularly between the tangs of one of the coil springs. As the housing 60 is being moved toward the disk 14 the extensions 24 exit through hole 62. The separation between the two extensions 24 is slightly larger than the diameter of the hole 62. As a result, when the housing 60 reaches its final position over the boss 44, the extensions 26 extend outwardly of the hole 62. They flex slightly radially toward each other and cooperate with the housing to hold all the clutch elements together as a single assembly, as shown in FIGS. 3 and 4.

The clutch 10 operates as follows. Normally, there are no rotational forces or torques applied to the clutch and the tangs 52A, 54A, 52B, 54B are positioned in the slots 46, 48, respectively, and are separated by troughs 66, 68. The housing 60 is coupled to a window dressing (not shown). Any rotational force on the window dressing causes a torque X to be applied to the housing 60 in either a clockwise or counterclockwise direction, as shown in FIG. 4. If the torque is in the clockwise direction, the housing 60 tries to move in response in the clockwise direction. This movement causes the axial wall 66B of trough 66 to move clockwise and apply a clockwise angular force on tang 52B. The coil spring 52 is wound in such a manner that this force on tang 52B causes the coil spring to tighten around drum 20. In this manner, the spring coil 52 resists the torque X. A similar resistance force is generated between the axial wall 68B and tang 54A of coil 50A. If the torque X is applied in the counterclockwise direction, the axial wall 66A applies a similar force on tang 54B. Thus the coil springs 50A, 50B, the spring drive 40 and the housing 60 are constructed and arranged to form a counter-rotational locking means that prevents the rotation of housing 60 from rotating in response to a torque applied to the housing.

Pulling cord 90 causes the gear pulley 30 to turn around the common axis of the clutch 10. As the gear pulley turns, it forces the planetary gears to turn in a planetary motion around gear 22. This rotation forces the spring drive 40. The speed of rotation of the housing 60 and the force applied to it (and hence the mechanical advantage of the clutch) depends on the relative sizes of the gear pulley 30 and planetary gears 48. Thus, the protection guard 12, the gear pulley 30 and the planetary gears 48 are arranged and constructed to transfer a rotational motion in either direction to the spring drive 40 at a pre-determined mechanical advantage. Therefore, these elements cooperate to form a bidirectional gear box for transferring rotational motion in either direction from the cord 90 to the spring drive 40.

Referring again to FIG. 4, as the spring drive 40 starts rotating in either direction, as indicated by arrow Y, one of the axial edges 46A, 46B comes into contact and applies a tangential force on one of the tangs 52B or 54B. This force causes the spring coil 50B to expand radially outward, thereby eliminating, or at least reducing the interference fit between the spring coil 50B and the surface of the drum 22. A similar action takes place in slot 47 to cause spring coil 50A to expand. As a result, the spring drive 40 is free to rotate with respect to drum 22. As the spring drive 40 continues to rotate, one of the edges 46A, 46B comes into contact (through respective tangs) with the walls of the troughs 66, 68. In this manner the rotation of the spring drive 40 is transmitted to the housing 60. Thus the counter-rotational locking means is disabled by the rotation of the spring drive 40.

Importantly, because of the arrangement of the gears in the gear box, the directions of rotation of the gear pulley and the housing 60 are the same, and therefore the clutch is easier and more intuitive to operate.

The housing is used to support and rotate or otherwise operate a standard window treatment.

The present invention provides several advantages over the prior art. It provides a higher mechanical advantage without an increase in size. It makes use of at least some of the components of a standard clutch to perform multiple functions. It provides rotation of the input member (the gear pulley) and the output member (the housing) in the same direction because the improved mechanical advantage of the clutch requires less spring coils then the prior art. Another advantage is that because of the clutch mechanism, the friction exerted by the coil spring is lower than in standard systems and, hence, require less force to raise and lower the window dressing. Moreover, placing the gear box between the coil springs and the pulley results in a device that operates more smoothly.

While the invention has been described with reference to several particular embodiments, it is to be understood that these embodiments are merely illustrative of the principles of the invention. Accordingly, the embodiments described in particular should be considered as exemplary, not limiting, with respect to the following claims. For example, the cord could be replaced by a chain, a rope, a string, or any other similar elongated member known in the art. Similarly, the antirotational means may be implemented using other means besides the coiled springs.

We claim:

1. A clutch for operating a window dressing comprising:
    an input member arranged to be activated by a user for operating the window dressing with a planetary gear;
    an output member coupled to said window dressing;
    antirotational means adapted to prevent said output member from rotation in response to a rotational torque from the window dressing; and
    a gear box coupled to said input member through said planetary gear and adapted to transmit a rotational motion at a mechanical advantage to said output member in response to the activation of said input member;
    wherein said gear box includes a stationary gear, a stationary drum attached to said stationary gear, a rotating member mounted coaxially on said drum and a planetary gear arranged between said gear pulley and said stationary gear to transfer rotation from said gear pulley to said rotating member.

2. The clutch of claim 1 wherein said input member includes an elongated element arranged for pulling by the user, and wherein said gear box includes a gear pulley coupled to said elongated element and arranged to rotate in response to the pulling of said elongated element.

3. The clutch of claim 2 wherein said elongated element is a cord.

4. The clutch of claim 1 wherein said antirotational means is associated with said stationary drum and said rotating member.

5. The clutch of claim 4 wherein said antirotational means includes spring coils adapted to form selectively an interference fit with said stationary drum.

6. A clutch for operating a window dressing mounted on a stationary structure, comprising:
    an end member adapted for mounting the window dressing to the stationary structure, said end member receiving a cord adapted for manipulation by a user to operate the window dressing, said end member including a gear box adapted to translate a movement of said cord into a rotation at a preselected mechanical advantage, said gear box including a planetary gear rotated by the cord;
    an output member adapted to couple said rotation to the window dressing; and
    an antirotational member coupled to said output member to prevent undesirable rotation of said output member;
    wherein said end member includes a disc having an inner surface and wherein said gear box includes a fixed gear coupled to said inner surface, a gear pulley adapted to couple to the cord, a planetary gear coupled to said gear pulley and said fixed gear to move in a planetary motion when said gear pulley is rotating; said planetary gear being coupled to said output member to rotate said output member.

7. The clutch of claim 6 wherein said antirotational means includes a hub sized and shaped to form a chamber with said disc, with said gear pulley, said planetary gear and said fixed gear being disposed in said chamber.

8. The clutch of claim 7 wherein said end member includes a drum extending axially with respect to said fixed gear and said antirotational means includes a drive including said hub and a boss telescopically positioned over said drum.

9. The clutch of claim 8 wherein said antirotational means includes coil springs coupled between said boss and said drum.

10. The clutch of claim 9 wherein said planetary gear is mounted on an axle, said axle being attached to said hub.

11. The clutch of claim 10 wherein said output member includes a housing telescopically mounted over said drum.

12. A bi-directional clutch for supporting a window dressing on a structure, said clutch comprising:

a protective guard adapted to be secured to the structure and including a disk with a lip and a drum disposed coaxially on the disk;

a drive having a boss and hub, said hub facing said lip to define a chamber, and said boss disposed telescopically over said drum;

a tubular housing disposed telescopically over said boss and adapted to engage the window dressing; and a gear box disposed in said chamber, said gear box being coupled to an elongated operating member and adapted to transfer a rotation to said tubular housing when said elongated operating member is manipulated by the user.

13. The clutch of claim 12 further comprising an antirotational member disposed between said drive and said tubular housing and adapted to prevent undesirable rotation of said tubular housing.

14. The clutch of claim 13 wherein said antirotational member includes a coil spring wound between said drum and said boss.

15. The clutch of claim 12 wherein said gear box includes a gear pulley arranged to receive said elongated member and including internal teeth, a stationary gear attached to said protective guard and a planetary gear rotationally mounted between said internal teeth and said stationary gear.

16. The clutch of claim 15 wherein said planetary gear is mounted on said hub.

17. The clutch of claim 16 wherein said gear box includes a plurality of planetary gears disposed evenly about said stationary gear.

18. The clutch of claim 15 wherein said gear pulley includes radial teeth arranged to engage said elongated member.

* * * * *